United States Patent [19]

Eng et al.

[11] Patent Number: 5,469,577
[45] Date of Patent: Nov. 21, 1995

[54] PROVIDING ALTERNATE BUS MASTER WITH MULTIPLE CYCLES OF BURSTING ACCESS TO LOCAL BUS IN A DUAL BUS SYSTEM INCLUDING A PROCESSOR LOCAL BUS AND A DEVICE COMMUNICATIONS BUS

[75] Inventors: Robert C. Eng; John W. Galella; Rex E. McCrary, all of Boca Raton; Mark G. McDonald, Delray Beach; Eric H. Stelzer; Frederick C. Yentz, both of Boca Raton, all of Fla.

[73] Assignee: International Business Machines Corporation, Armonk, N.Y.

[21] Appl. No.: 250,328

[22] Filed: May 27, 1994

Related U.S. Application Data

[63] Continuation of Ser. No. 752,725, Aug. 30, 1991, abandoned.

[51] Int. Cl.$^6$ .................................................. G06F 13/00
[52] U.S. Cl. ..................... 395/290; 395/308; 395/293; 340/825.5; 364/242.42; 364/240.2; 364/DIG. 1; 395/296; 395/868; 395/297; 395/855
[58] Field of Search ......................... 395/800, 775, 395/725, 650, 550, 325; 370/77, 85.1, 85.6, 85.7, 85.9, 91, 95.1, 95.3; 340/825, 825.06, 825.5, 825.51

[56] References Cited

U.S. PATENT DOCUMENTS

| | | | |
|---|---|---|---|
| 4,257,095 | 3/1981 | Nadir | 395/325 |
| 4,570,220 | 2/1986 | Tetrick et al. | 395/325 |
| 4,837,682 | 6/1989 | Culler | 395/325 |
| 4,961,140 | 10/1990 | Pechanek et al. | 395/325 |
| 5,099,420 | 3/1992 | Barlow et al. | 395/825 |
| 5,127,089 | 6/1992 | Gay et al. | 395/325 |
| 5,129,090 | 7/1992 | Bland et al. | 395/725 |
| 5,168,568 | 12/1992 | Thayer et al. | 395/725 |
| 5,253,348 | 10/1993 | Scalise | 395/325 |

OTHER PUBLICATIONS

IBM Micro Channel Architecture—Supplemental for the PS/2 Hardware Interface Technical Reference, Nov. 1989.
Gearbox Model 800 (7568) Technical Reference Manual, Mar. 1990.
i486 Processor Hardware Reference Manual, 1990.
An article entitled "Gearbox Model 800 Industrial Computer" 1991.
IBM Gearbox Model 800 (7568) Technical Reference Newsletter, Oct. 1991.

*Primary Examiner*—Mehmet Geckil
*Assistant Examiner*—Alpesh M. Shah
*Attorney, Agent, or Firm*—Winfield J. Brown; Bruce D. Jobse

[57] ABSTRACT

Disclosed method and apparatus allow for balanced usage of resources in dual bus computing systems wherein: (1) principal resources of the system— including a processor, a local bus, local bus controls, and a memory subsystem—are contained in a single system unit (e.g. a card); (2) devices are coupled to the system unit and to each other through a device communications bus that is also accessible to the processor of the system unit; (3) the system processor is required to have principal access to the local bus, as a "System Bus Master", for time critical functions such as memory refresh; and (4) the devices include one or more devices that are required to have controlling access to the resources of the system unit, and for that purpose are required to have controlling access to the local bus as Alternate Bus Master entities. The disclosed arrangement allows an Alternate Bus Master operating in a burst mode, in which several cycles of data transfer may occur consecutively, to have continuous access to the local bus after a single signal handshaking exchange with the local bus controls; subject to over-riding conditions which ensure timely accomplishment of the time critical functions controlled by the processor/System Bus Master. The over-riding conditions are detected by special logic that acts, when necessary, to interrupt Alternate Bus Master access to the local bus without affecting the state of connection between the respective Alternate Bus Master and the communications bus.

10 Claims, 6 Drawing Sheets

PROVIDING ALTERNATE BUS MASTER WITH MULTIPLE CYCLES OF BURSTING ACCESS TO LOCAL BUS IN A DUAL BUS SYSTEM INCLUDING A PROCESSOR LOCAL BUS AND A DEVICE COMMUNICATIONS BUS

This is a continuation of application Ser. No. 07/752,725, filed Aug. 30, 1991 now abandoned.

BACKGROUND OF THE INVENTION

1. Field of the Invention

The invention relates generally to methods and apparatus for improving data rates in computer systems having a dual bus architecture, i. e., in computer systems having a first bus included in a System Bus Master (for example, the local bus on the system processor card or complex), and a second bus for coupling an Alternate Bus Master (and typically other devices as well) to the first bus. More particularly, the invention relates to methods and apparatus for improving data rates to/from a processor card's dynamic random access memory (DRAM) subsystem during Alternate Bus Master initiated memory cycles, including a plurality of memory cycles required to support burst mode data transfers, over each of the aforesaid buses and over the interface between the two buses.

2. Description of the Related Art

Commercially available high performance industrial computing systems, such as the IBM System 7568 ("IBM" is a trademark owned by the International Business Machines Corporation), are well known by those skilled in the art. Such systems are typically designed to function without operator attendance in extreme environments, are easy to maintain and have the dual bus structure referred to hereinabove.

In the IBM System 7568, briefly described hereinafter for background purposes only, circuit cards are packaged in individual shrouds that are plugged into a passive backplane. The backplane provides power to the attached cards and provides a card to card communication bus (an example of the "second" bus referred to hereinbefore) which, in the illustrative IBM System 7568, is referred to as a Micro Channel bus ("Micro Channel" is a trademark owned by the International Business Machines Corporation).

The invention will, for the sake of illustration only, be set forth hereinafter with reference to the dual bus Micro Channel architecture found in computers such as the IBM System 7568. Those skilled in the art will readily appreciate that the IBM Micro Channel bus is an example of the more general class of card to card type communication buses found in dual bus architectures in which the invention may be advantageously used. Accordingly, although the well known IBM dual bus Micro Channel architecture serves as a vehicle for illustrating the principles of the invention and will be used as such herein, it is not intended that the invention be limited to use in IBM dual bus Micro Channel systems per se.

The base system for the 7586 consists of a processor card and a system resource card. These two cards provide the function of a well known IBM PS/2 planer board ("PS/2" is a trademark owned by the International Business Machines Corporation). The system resource card contains the system interfaces for video, keyboard, diskette, and configuration information stored in low power CMOS memory. The processor card contains the microprocessor, math coprocessor (or other floating point unit), and base memory with error correction code (ECC). Communications between the microprocessor and the base memory take place over a local on card bus (an example of the "first" bus referred to hereinabove). In the IBM system 7586 the microprocessor is an Intel 80386 ("Intel" is a trademark owned by Intel Corporation).

Although the invention to be described hereinafter may be implemented in an 80386 based system, those skilled in the art will readily appreciate that more advanced microprocessors are presently being introduced, such as the Intel 80486 processor. Accordingly, the timing information discussed in developing the background of the invention will be referenced to the 80486, though the particular processor utilized in conjunction with the invention is not intended to be an invention limiting factor.

Timing in the 80486, and its associated DRAM subsystem, is based upon a 25 MHz clock or 40 ns period. Minimum microprocessor cycle time is 80 ns during which the 80486 first sets up addressing (in one 40 ns period) and then looks for data (in the second 40 ns period).

Additional time, or wait states, can be added to the 80 ns microprocessor cycle by, for example, use of a device ready signal. A 40 ns wait state would be a natural cycle extension increment for systems utilizing a 25 MHz clock.

In systems such as the illustrative IBM System 7568, the interface to resources located on the processor card by an Alternate Bus Master is provided through a Micro Channel Arbitration Process (or more generally through the arbitration process associated with whatever card to card type communications bus is used in a given dual bus system), resident on the aforementioned system resource card. Such process, and indeed the Micro Channel structure itself, are described in many publications, including the technical reference manual for the IBM System 7568. The description of the Micro Channel Arbitration Process, the Micro Channel structure and related signalling, all set forth in the IBM System 7586 technical reference manual, is hereby incorporated by reference.

In accordance with the teachings of the aforementioned reference, after the arbitration process has established an Alternate Bus Master as the Micro Channel bus owner, the Alternate Bus Master is allowed to request a transaction to or from processor memory. By default, as taught in the reference, only one Micro Channel device can own the Micro Channel bus at any given point in time.

The aforementioned memory request may be managed via a well known system hold (SHOLD) and system hold acknowledge (SHOLDA) handshaking technique. The details of a basic process which may be used to provide the aforementioned (or similar) handshaking capability, is described in Intel documentation supporting the 80486 processor, such as the i486 Microprocessor Hardware Reference Manual, hereby incorporated by reference ("i486" is a trademark owned by Intel Corporation). A similar handshaking capability could, for example, include a local bus access request/acknowledgement procedure and request/acknowledgement techniques in general.

SHOLD is a signal generated on the processor card itself based on an address decode where the address is provided to the processor by the Alternate Bus Master via the Micro Channel bus/processor interface. More particularly, as will be explained hereinafter in the Detailed Description of the invention, the SHOLD signal results from the Alternate Bus Master driving certain processor control signals via the Micro Channel bus to signal the start of an Alternate Bus Master controlled data transfer.

Functionally, the SHOLD signal is a request for the processor card to relinquish its on card bus (the Micro Channel bus is already owned by the Alternate Bus Master following the aforementioned arbitration process), in order to allow an external cycle to take place. According to the prior art SHOLD/SHOLDA handshaking scheme, the on card processor bus is not relinquished until the processor acknowledges the SHOLD request with the SHOLDA signal. The SHOLDA signal will always be generated in response to an SHOLD signal; however, the timing of the SHOLDA signal may vary based, for example, on processor activity in progress when the SHOLD signal is generated (e.g., a memory refresh or other local bus memory access).

According to techniques utilized in the exemplary IBM System 7568, the SHOLDA signal (which stays on card) indicates the start of an on card transfer of data to or from the local bus. The actual "handshake" signal back to the Alternate Bus Master takes the form of another control signal, sent over the Micro Channel interface (to be described in more detail hereinafter), which indicates that the on card data transfer to or from the local bus is complete.

Those skilled in the art will recognize, in the context of a dual bus system architecture, that during an Alternate Bus Master Micro Channel granted cycle the processor card is not restricted from conducting local on card cycles both from central processing unit (CPU) cache memory and the processor's on card memory (in particular, DRAM).

This prior art capability of allowing multi-device accesses to system resources (such as DRAM) may on the one hand be used to enrich the system processing power; but is often achieved at the expense of making optimal use (in terms of data transfer rate) of other system resources, such as the Micro Channel structure in a dual bus architecture. In view of this problem, it would be desirable, in computing systems having a dual bus structure, to optimize and in some sense balance the use of resources located on the processor card with the use of other system resources, such as a Micro Channel bus and devices attached thereto.

As an example of what is desirable, given the mutually exclusive bus structures in a dual bus system, the CPU should be able to execute instructions from its cache memory as well as across its own (local) bus in the most efficient manner possible without unduly degrading the performance of the Micro Channel bus interfacing with the local bus. The need for the processor to have this capability is well recognized in situations where (1) DRAM refresh requests need to be serviced; (2) the processor needs to fill its instruction prefetch queue from DRAM without losing time waiting for the availability of its local bus; and (3) the processor is operating out of cache memory and/or needs to access DRAM, etc. Accordingly, whenever the processor is put into a "HOLD" state by an Alternate Bus Master, it should be "held up" in a manner that is both timely and productive when looking at the system as a whole.

In the present commercially available version of the IBM System 7586, the 80386 processor card is implemented such that the local bus is relinquished to the processor after each memory cycle. Another SHOLD/SHOLDA handshake sequence is required for each successive processor card/local bus cycle required by the Alternate Bus Master. This methodology was designed to insure that the CPU would have the right to hold off the oncoming Alternate Bus Master in order to conduct a memory refresh, code fetch or data access to continue operation. This prior art technique proved to be an efficient way to optimize the CPU (local) bus; however, the efficiency of the Micro Channel bus could be severely degraded during Alternate Bus Master possession.

As an example, if a typical local bus memory cycle via the Micro Channel bus requires 400–500 ns, and a handshake sequence is required for each transfer over the Micro Channel bus, an overhead expenditure on the order of 1 microsecond is required for each and every transfer across the Micro Channel bus assuming a 500–600 ns handshake interval. Those skilled in the art will readily appreciate that such time demands can rapidly degrade the performance of the Micro Channel bus, particularly where a burst transfer sequence requiring many cycles is utilized to perform an Alternate Bus Master data transfer.

"Burst" mode transfers referred to herein contemplate the need for intensive/long streams of data passing along the Micro Channel bus to/from CPU on card memory. An example of a well known Alternate Bus Master which utilizes burst type transfers to efficiently move data across the Micro Channel bus interface with a processor card includes bursting direct memory access (DMA) type devices responsible for a direct access storage device (DASD) subsystem.

During, for example, the loading of an operating system, the performance of file management operations, etc., a DASD subsystem Alternate Bus Master may be required to transfer millions of bytes of information which, according to the known dual bus management techniques, would require repetitive handshaking in order to manage the tasks of data transfer per se, memory refresh management, instruction prefetch queue memory access, etc.

It should be noted that the prior art dual bus management techniques implemented utilizing the aforementioned handshaking scheme have the potential to degrade Micro Channel bus performance in other situations as well.

For example, the use of the handshaking method was perceived as a way to provide a memory refresh cycle to on card memory as soon as a channel ready return signal "CHRDYRTN" (explained in detail in the incorporated Micro Channel architecture oriented publication) was given for the previous Alternate Bus Master cycle, by not responding to the next command from the Alternate Bus Master so long as the SHOLDA line was pulled low (inactive) by the processor during a refresh request. This refresh request cycle was handled while the off card Alternate Bus Master was still in control of the Micro Channel bus.

As such, another problem with the prior technique for managing the dual bus structure occurs if an extended SHOLDA low state (inactive) persists while the Alternate Bus Master has already started the beginning of a command cycle. In this situation, even if a master of higher priority is preempting for the Micro Channel bus, the currently executing master will not be able to exit the channel until the original command has been serviced by the CHRDYRTN signal, further stalling the Micro Channel bus.

Accordingly, it would be desirable to be able to provide an Alternate Bus Master bursting data rate management technique, for use in dual bus systems, which achieves a balance between the need for optimizing the use of the system processor and its associated resources (such as DRAM) and Alternate Bus Master/Micro Channel bus efficiency, with the overall objective of reducing the overhead associated with data transfers generally, and more particularly with the object of reducing the overhead associated with burst mode data transfers.

Furthermore, it would be desirable to provide dual bus management techniques which are not prone to unduly stalling the card to card communications bus (such as the IBM Micro Channel bus) as a result of performing required memory refresh operations, etc.

Still further, it would be desirable to provide methods and apparatus, for managing the interface between a local processor bus and a Micro Channel bus which (1) take into account the necessity of having to promptly service pending memory refresh requests; (2) limit multiple Alternate Bus Master accesses to on card memory to a predetermined (but potentially programmable) number of cycles in situations where the processor is requesting the use of its local on card memory bus; and (3) allow an Alternate Bus Master unlimited accesses to on card memory in situations where the Alternate Bus Master owns the Micro Channel bus and the system processor subsequently requests the Micro Channel bus. Such methods and apparatus, as will be demonstrated hereinafter, may be utilized to achieve the desired optimal use of system resources and balance of performance (in terms of data rate) between the system processor and a Micro Channel type bus in computer systems having a dual bus structure.

SUMMARY OF THE INVENTION

It is a general object of the invention to provide methods and apparatus which optimize and in some sense balance the use of resources located on the processor card (e.g., memory, the local bus, etc.) with the use of other system resources, such as a Micro Channel type card to card communications bus and devices attached thereto.

Furthermore, it a general object of the invention to provide methods and apparatus which enable the CPU in a dual bus computing system to execute instructions from its cache memory, as well as across its own (local) bus, in the most efficient manner possible without unduly degrading the performance of the card to card communications bus (such as the IBM Micro Channel bus) connected to and interfacing with the CPU local bus.

It is a specific object of the invention to provide methods and apparatus which enable the CPU to have the aforementioned capability in situations where DRAM refresh requests need to be serviced; where the processor needs to fill its instruction prefetch queue from DRAM (without losing time waiting for the availability of its local bus); and where the processor is operating out of cache memory and/or needs to access DRAM.

Furthermore, it is a specific object of the invention to provide methods and apparatus which are operative, whenever the processor is put into a "HOLD" state by an Alternate Bus Master, to "hold up" the processor in a manner that is both timely and has the potential for maximizing system productivity as a whole.

Further yet, it is a specific object of the invention to provide an Alternate Bus Master bursting data rate management technique, for use in dual bus systems, which achieves a balance between optimizing the use of the system processor and its associated resources (e.g., DRAM, the local bus, etc.) and Alternate Bus Master/Micro Channel bus efficiency.

Still further, it is a specific object of the invention to provide data rate management techniques which in general reduce the overhead associated with data transfers in dual bus computing systems, and more particularly reduce the overhead associated with burst mode data transfers in such systems.

Also, it is a specific object of the invention to provide dual bus management techniques, for use in dual bus computing systems, which are not prone to unduly stalling the card to card communications bus (such as the IBM Micro Channel bus) as a result of having to perform required operations, such as memory refresh operations, etc., in portions of the system to which the card to card communications bus is attached.

Yet another specific object of the invention is to provide methods and apparatus for managing the interface between a local processor bus and a Micro Channel type card to card communications bus which (1) take into account the necessity of having to promptly service pending memory refresh requests; (2) limit multiple Alternate Bus Master accesses to on card memory to a predetermined (but potentially programmable) number of cycles in situations where the processor is requesting the use of its local on card bus; and (3) allow an Alternate Bus Master unlimited accesses to on card local bus in situations where the Alternate Bus Master owns the Micro Channel bus and the processor subsequently requests the Micro Channel bus.

According to the invention, the aforestated objectives may be realized by implementing techniques which allow an Alternate Bus Master (under certain conditions to be described hereinafter) to make multiple accesses to processor card or complex local bus resources during a handshake sequence (more particularly, during the time interval between the generation of the aforementioned SHOLD and SHOLDA signals, or analogous signals); as opposed to the single access per handshake practiced utilizing prior art dual bus management techniques.

According to a further aspect of the invention, the novel dual bus management techniques (and apparatus for implementing such techniques), are centered about a balancing of resource priorities between the needs of the System Bus Master (including, for the processor card type System Bus Master example set forth herein, both its local on card priorities and attempts by the processor card to engage in external communications), and the priorities of any Alternate Bus Master in possession of the card to card communications bus and/or CPU bus.

The invention contemplates achieving this balance through the use of a scheduling procedure which will be referred to hereinafter as the Bus Hold On Grant ("BSHOG") procedure.

In particular, according to one embodiment of the invention, the BSHOG procedure permits multiple Alternate Bus Master accesses to on card (processor card) memory resources during a given handshake interval subject to: (a) terminating an on card access by the Alternate Bus Master at the end of a current card to card communications bus (e.g., Micro Channel bus) data transfer cycle if a memory refresh is pending; (b) limiting Alternate Bus Master access to on card (processor card) memory to a predetermined number of card to card communications bus memory cycles if the processor (on the processor card) is requesting ownership of its local on card memory bus; and (c) allowing an Alternate Bus Master unlimited access to on card (processor card) memory in situations where the Alternate Bus Master is in possession of the card to card communications bus and the CPU requests use of the card to card communications bus.

According to a further embodiment of the invention, the aforementioned BSHOG procedure may be dynamically modified or programmed so that the aforementioned predetermined number of card to card communications bus data transfer cycles is a variable.

Furthermore, according to a preferred embodiment of the invention, the BSHOG procedure may be implemented as part of the on card (processor card) control logic associated with the CPU in dual bus computing systems such as the IBM System 7586 (80386 based) more modern 80486 dual bus systems, and the like.

According to one aspect of the invention, a portion of the BSHOG procedure may be implemented, assuming an Alternate Bus Master is in possession of the processor card local bus, via a method comprising the steps of: (a) determining if a processor card memory refresh request is pending; (b) terminating the activity of any Alternate Bus Master on the processor card (or complex) local bus at the end of a current card to card communications bus cycle whenever a processor card memory refresh request is determined to be pending; (c) turning control of the processor card local bus over to the processor after performing step (b); and (d) otherwise permitting the Alternate Bus Master to hold onto the processor card local bus without requiring a local bus reacquisition handshake sequence, over at least two data transfer cycles from the time the Alternate Bus Master gained control of the processor card local bus if necessary to complete Alternate Bus Master data transfer activity.

Further, according to another aspect of the invention, a portion of the BSHOG procedure may be implemented, assuming a bursting Alternate Bus Master has gained control of the local on card (processor card) bus and is conducting data transfer cycles when the CPU requests the local bus, via a method comprising the step of distributing the handshake interval (i.e., the period between a SHOLD type signal and SHOLDA type signal) over a plurality of Alternate Bus Master data transfer cycles. One embodiment of the invention contemplates the number of data transfer cycles over which the handshake interval is distributed be predetermined and fixed. An alternate embodiment of the invention contemplates the number of cycles being programmable or dynamically capable of being altered to optimize system performance based on the application being run, historical use, etc.

Still further, according to yet another aspect of the invention, a further portion of the BSHOG procedure may be implemented, again assuming a bursting Alternate Bus Master has control of the processor local bus and is conducting data transfer cycles thereon, via a method comprising the steps of: (a) determining if the CPU has been placed into a state wherein it is awaiting access to the card to card communications bus (e.g., Micro Channel bus), in accordance with a predefined set of system bus arbitration procedures; and (b) permitting the Alternate Bus Master an unrestricted number of data transfer cycles to complete its data transfer activity before relinquishing the card to card communications bus.

The invention features methods and apparatus which balance the performance of the System Bus Master and Alternate Bus Master in dual bus computing systems to achieve overall data transfer rate performance improvement across the system.

Furthermore, the invention features methods and apparatus which prevent the degradation of the card to card communications bus (Micro Channel type bus) resources in a dual bus computing system, particularly when an Alternate Bus Master is engaged in burst mode communications with memory or other local bus device on the processor card.

These and other objects and features of the invention will be recognized by those skilled in the art upon reviewing the detailed description set forth hereinafter in conjunction with the accompanying Drawing.

DETAILED DESCRIPTION

Figure 1:
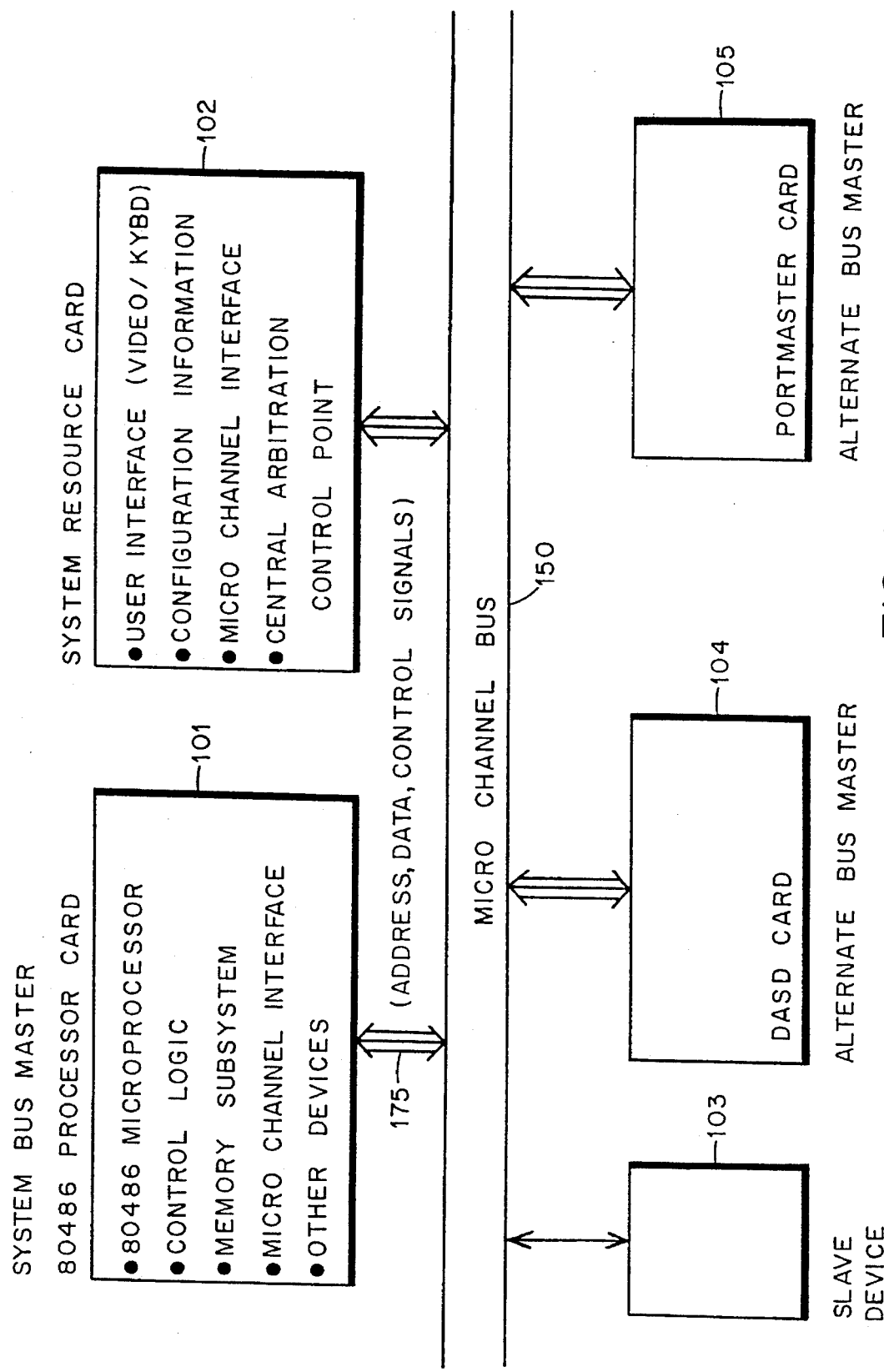
FIG. 1 depicts an illustrative set of cards that may be attached to the Micro Channel bus in a dual bus Micro Channel system architecture such as the one presently available in the IBM System 7586, with an 80486 processor card, described in general with reference to FIG. 2, being used in place of the 80386 processor in the IBM System 7568.

As indicated hereinabove, FIG. 1 depicts an illustrative set of cards that may be attached to the Micro Channel bus in a dual bus Micro Channel system architecture such as the one presently available in the IBM System 7568.

Figure 2:
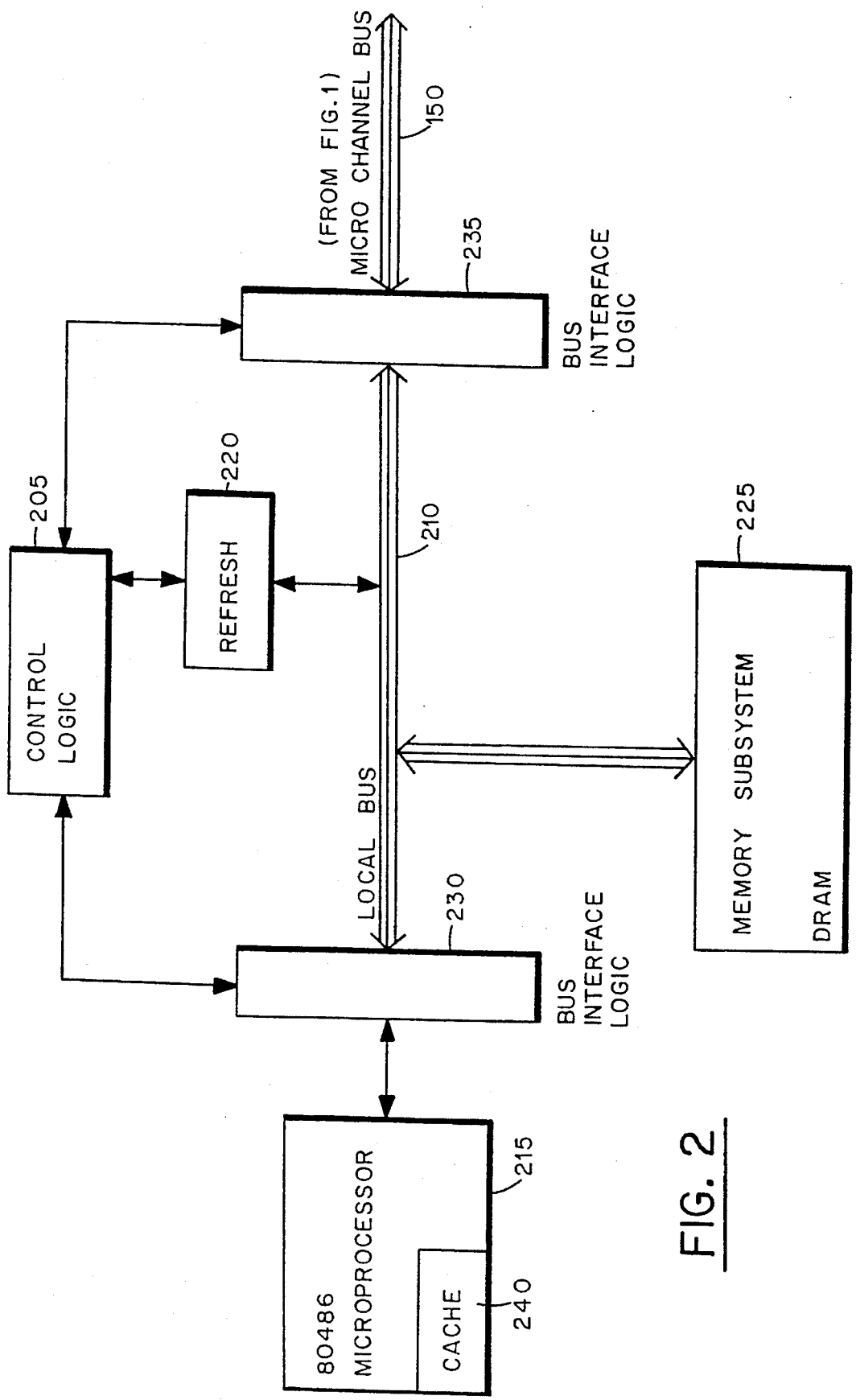
FIG. 2 depicts, in a high level block diagram format, portions of a 80486 processor card including a processor (local) bus that interfaces with the Micro Channel bus structure depicted in FIG. 1.

An 80486 processor card, shown as card 101 in FIG. 1 and described in general hereinafter with reference to FIG. 2, is depicted in place of the 80386 processor that is incorporated in the System 7586, although, as indicated hereinbefore, the particular type of microprocessor incorporated on the processor card (or processor complex) is not meant to be a factor limiting the scope or utility of the invention.

The processor card, such as processor card 101, is defined as the System Bus Master in the IBM System 7568. In the illustrative system, processor card 101 contains the microprocessor itself, control logic, a memory subsystem, a Micro Channel bus interface and other devices, several of which will be described hereinafter to the extent necessary to explain the principles of the invention.

The interface between the System Bus Master (card 101) and Micro Channel bus 150, depicted as interface 175 in FIG. 1, carries address, data and control signals as described in the Micro Channel architecture related publication previously incorporated herein by reference.

Also shown attached to Micro Channel bus 150 (in the illustrative system depicted in FIG. 1), via separate interfaces, are system resource card 102, an unspecified slave device 103 (for example, a printer card), and a set of Alternate Bus Master cards including (for the sake of illustration) a commercially available DASD card and Portmaster card, shown as cards 104 and 105 respectively.

It is in the context of a dual bus computing system, such as the one depicted in FIG. 1, that the invention will be described. The term "dual bus" refers to a system that includes the combination of a local bus on a processor card as illustrated, for example, by local bus 210 shown in FIG. 2 (or alternately by a processor complex local bus), interfacing with a separate bus structure, such as Micro Channel bus 150 of FIG.

Cards like those represented by system resource card 102, slave device 103, DASD card 104 and Portmaster card 105, are all commercially available devices which need not be described further herein to illustrate the principles of the invention. One should note, however, that (1) the invention is directed to the cooperation between (management of) the dual buses (such as the local bus and Micro Channel bus depicted in FIGS. 1 and 2) in a dual bus computing system; and that (2) one important aim of the invention is to enable both the System Bus Master and one of the Alternate Bus Masters shown in FIG. 1 (where cards like DASD card 104 or Portmaster card 105 can serve as an Alternate Bus Master) to communicate with each other (via the exemplary dual bus structure) in a manner that maximizes system performance, particularly when burst mode transfers are executed over the local bus/Micro Channel bus interface.

Additionally, it should be noted that system resource card 102 is presumed to be used to control Micro Channel bus arbitration (as taught in the incorporated Micro Channel architecture related publication) in the exemplary system being set forth herein for the purpose of illustrating the principles of the invention, and that system resource card 102, as previously indicated, is presumed to contain the system interfaces for video, keyboard, diskette, and configuration information stored in low power CMOS memory.

Furthermore, it should be noted that the control logic located on processor card 101 (shown as control logic 205 in FIG. 2) is a preferred (but not necessarily the only) location for implementing the data transfer rate/dual bus management techniques taught herein. For example, in processor complex arrangements the aforementioned control logic may be spread over two or more cards, and the invention may similarly be implemented in logic located in various other portions of the complex, or even conceivably outside the card or complex altogether.

Having set forth in FIG. 1 an example of a system in which the invention may be utilized, reference should be made to FIG. 2 which depicts, in a high level block diagram format, portions of an 80486 processor card, including a processor (local) bus, that interfaces with the Micro Channel bus structure depicted in FIG. 1.

As indicated hereinabove, FIG. 2 illustrates a processor card (though again, the invention may be used in processor complex oriented systems, in systems containing the System Bus Master and Alternate Bus Master on one card, etc.), including local bus 210, control logic 205, the 80486 processor itself, shown as processor 215 in FIG. 2, refresh logic 220, memory subsystem DRAM 225, bus interface logic devices 230 and 235 for interconnecting local bus 210 and control logic 205 to processor 215 and Micro Channel bus 150, respectively. Bus interface logic 235 may be thought of as including (or alternatively being connected to) interface 175 shown in FIG. 1.

Processor 215 is also shown to include its own cache memory (cache 240), and other caches (secondary level caches not shown) may be included on the processor card and be coupled to processor 215 via local bus 210.

The architecture of the processor card depicted in FIG. 2 is presently commercially available in the IBM 7586 system, with an 80386 processor instead of the depicted 80486 processor. Accordingly, the architecture of a processor card such as the processor card depicted in FIG. 2 is so well known by those skilled in the art that it need not be described further herein in order to understand the principles of the invention.

However, it should be noted that control logic 205 on the processor card depicted in FIG. 2 is normally operative to (1) control the ownership of the local bus, including implementation of the prior art handshaking technique referred to hereinbefore (a mandated once per data transfer cycle handshake), making sure only one device at a time is on the local bus; (2) insure that all devices interfacing with the processor card are synchronized; and (3) control memory refresh.

As indicated elsewhere herein, according to a preferred embodiment of the invention, the control logic for a processor card (e.g., control logic 205), or the control logic in a processor complex, is the preferred location in which to implement the BSHOG dual bus management process being described herein.

Figure 3:
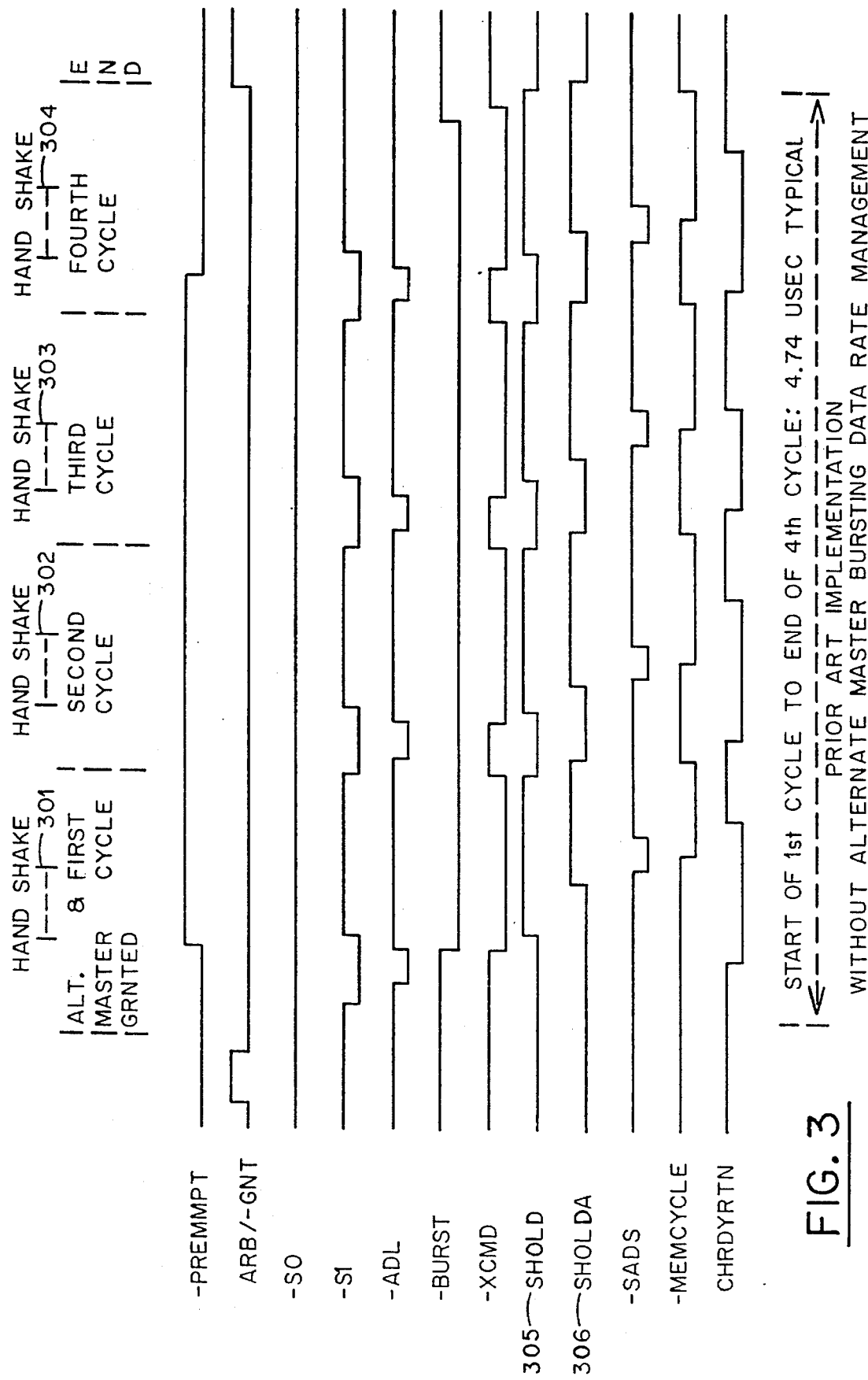
FIG. 3 depicts a set of control signals generated by a prior art implementation of a method for removing a processor card generated System Hold Acknowledge (SHOLDA) signal after each cycle completed by an Alternate Bus Master. The control signals depicted in FIG. 3 result when the central processing unit (CPU) does not require the local bus between alternate master cycles.
Figure 4:
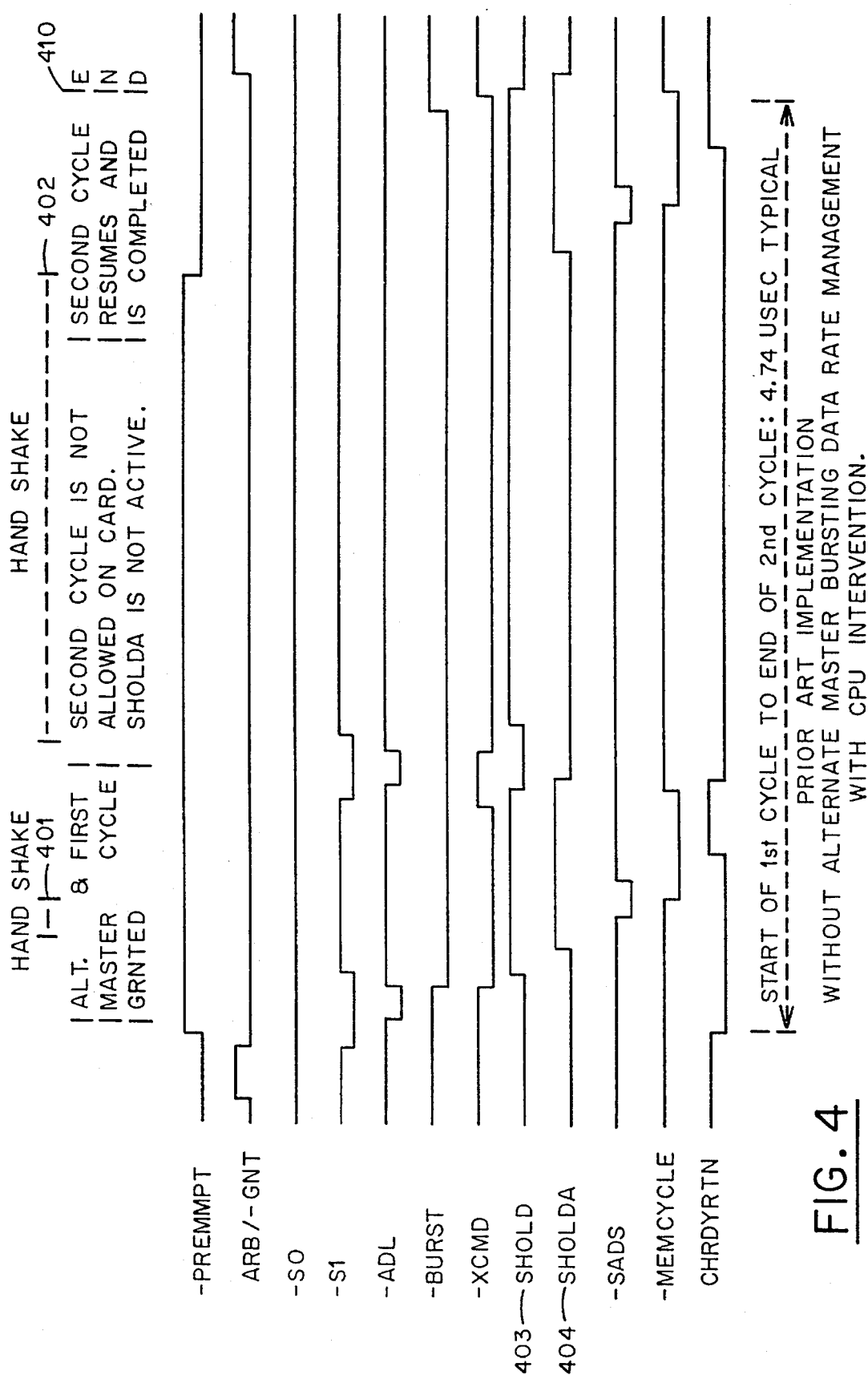
FIG. 4 depicts a set of control signals generated by a prior art implementation of a method for holding off the Alternate Bus Master from the processor card, thereby causing the local bus to be yielded by the alternate master, whenever the CPU requires the local CPU bus between alternate master cycles.
Figure 5:
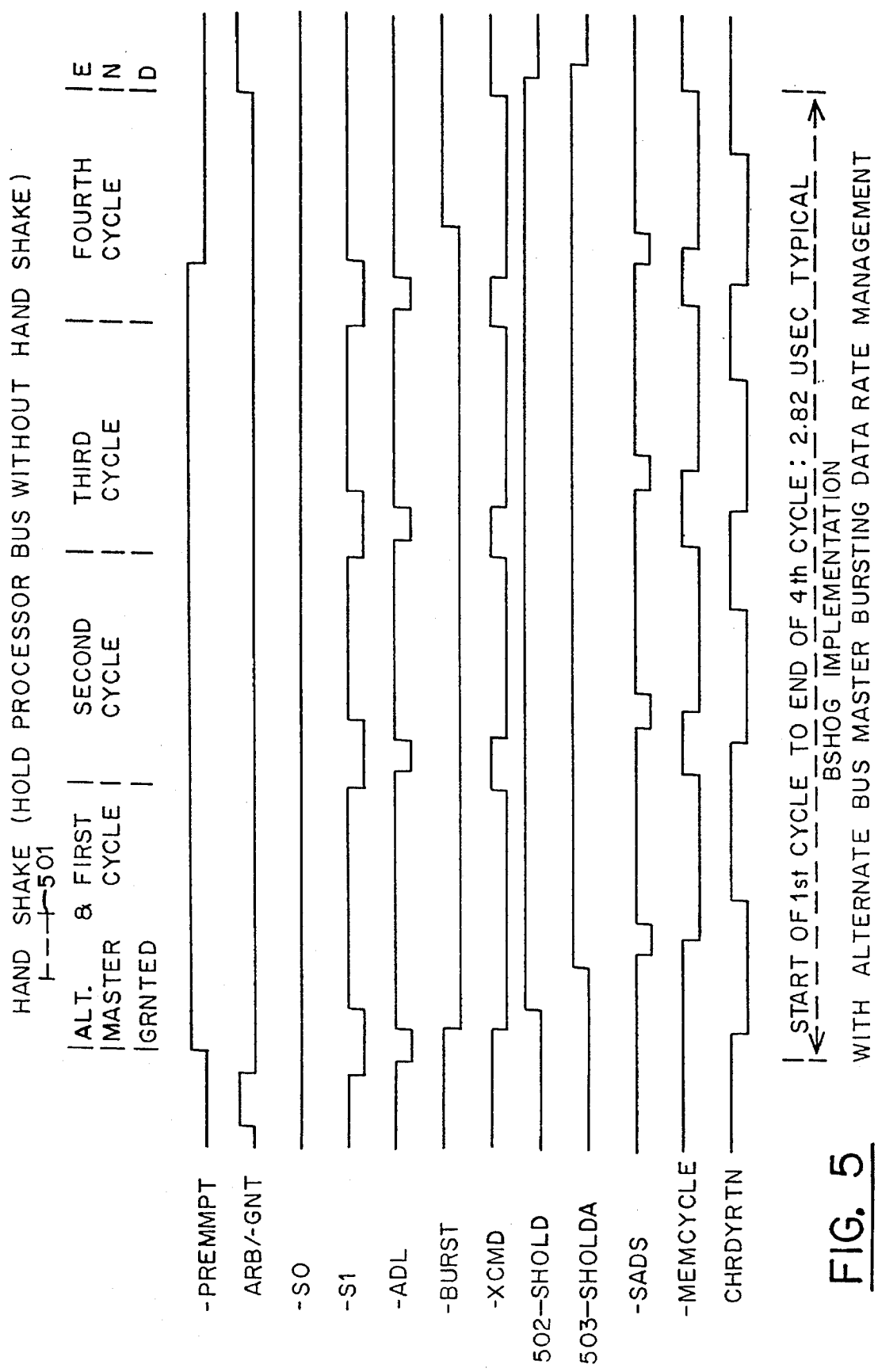
FIG. 5 depicts a set of control signals, generated when implementing the novel techniques described herein, to effectively manage (and increase) alternate master bursting data rates in computing systems having a dual bus architecture.

Having laid the foundation for describing the invention, reference should be made to FIGS. 3–5 which depict sets of control signals generated using the previously referenced (prior art) dual bus management techniques (resulting in the control signals depicted in FIGS. 3 and 4); compared with a set of control signals depicted in FIG. 5, generated utilizing the teachings of the invention to efficiently manage data transfers (including burst mode data transfers) in a computing system having a dual bus architecture.

The twelve control signals referred to in each of FIGS. 3–5, although well documented in the incorporated references, will be briefly reviewed hereinafter in conjunction with Table 1, set forth immediately hereinbelow, for the sake of completeness.

TABLE 1

| Signal | Source | Target | Function |
| --- | --- | --- | --- |
| −PREMPT | A. Master | C.A.C.P. | Micro Channel |
| +ARB/−GNT | C.A.C.P. | A. Master | Micro Channel |
| −S0 | A. Master | P. Card | Micro Channel |
| −S1 | A. Master | P. Card | Micro Channel |
| −ADL | A. Master | P. Card | Micro Channel |
| −BURST | A. Master | P. Card | Micro Channel |
| −XCMD | A. Master | P. Card | Micro Channel |
| SHOLD | Hold Logic | Processor | On Card |
| SHOLDA | Processor | Hold Logic | On Card |
| −SADS | Local Bus | Local Bus | On Card |
| −MEMCYCLE | Memory C. | Memory C. | On Card |
| CHRDYRTN | P. Card | A. Master | Micro Channel |

In Table 1, the terms "Alternate Bus Master", "Central Arbitration Control Point" (located on system resource card 102 in the illustrative embodiment of the invention), the "Processor Card" and "Memory Control" (typically located on the processor card), are abbreviated respectively as follows: "A. Master", "C.A.C.P." "P. Card" and "Memory C.". The other terms used in Table 1 are self-explanatory. It should be noted for the sake of completeness that there are instances where the processor card or complex can be the source of the −PREMPT signal, however such instances are not necessary for explaining the principals of the invention.

The first column in Table 1, the "Signal" column, indicates the signal name for each signal shown in the diagrams presented in FIGS. 3–5.

The second column, the "Source" column, indicates the device that generates each named signal in the illustrative embodiment of the invention being presented with reference to FIGS. 1 and 2. Thus, for example, A. Master in the Source column indicates that the source of the named signal is from an Alternate Bus Master, such as DASD card 104, Portmaster card 105, etc.; C.A.C.P. in the same column indicates the Central Arbitration Control Point on system resource card 102, in the illustrative system being used to described the invention, is the source of the named signal, etc.

The "Target" column in Table 1 indicates the target device for each named signal and finally the "Function" column indicates whether the named signal is designed to further a Micro Channel bus oriented function or an on card (processor card) function, in the illustrative system in which the invention may be implemented.

Thus Table 1 indicates that the –PREMPT signal is generated by an Alternate Bus Master, is targeted for the Central Arbitration Control Point on system resource card 102 of FIG. 1, and has a Micro Channel bus related function which, in the case of –PREMPT, is the Alternate Bus Master's request for ownership of the Micro Channel bus.

From Table 1 it can also be seen that +ARB/–GNT (in the illustrative system) is generated by system resource card 102, indicating to the Alternate Bus Master that it (the Alternate Bus Master) has entered arbitration when +ARB/–GNT is high; and that the Micro Channel bus has been granted to the Alternate Bus Master when the +ARB/–GNT signal is low.

The –S0 and –S1 signals, according to Table 1, are signals that are generated by an Alternate Bus Master, targeted for a slave device (the slave is processor card 101 in the illustrative system which supports the invention), to indicate whether a Micro Channel bus write (signal –S0 low) or Micro Channel bus read (signal –S1 low) cycle is being executed.

Table 1 further indicates that –ADL is an Alternate Bus Master signal targeted to the Micro Channel bus slave (processor card 101 in the illustrative system), to indicate that a valid address is being presented by the Micro Channel bus (signal –ADL low) and that the address should be latched by the slave device.

The –BURST signal shown in Table 1 is the Alternate Bus Master's signal to indicate that multiple cycles will be run until finished or preempted (signal –BURST low). The target for this signal in the illustrative system is both the Central Arbitration Control Point on system resource card 102, and processor card 101.

The –XCMD signal shown in Table 1 is Alternate Bus Master's signal to indicate the data transfer part of the cycle (signal –XCMD low). It is effectively a data transfer strobe and the data is actually transferred at a given cycle.

The SHOLD and SHOLDA signals shown in Table 1, as described both hereinbefore and in the incorporated references, are, in the illustrative system in which the invention is being described, on card (processor card) signals to indicate to the microprocessor that an off card device is requesting the local bus (signal SHOLD high); and that the processor is ready to give up the local bus (signal SHOLDA high).

The SHOLD signal is generated by HOLD logic on the processor card and is transmitted to the microprocessor itself. The microprocessor indirectly generates the SHOLDA signal when it is ready to give up the local bus.

The –SADS signal shown in Table 1 is an on card (or complex) signal to indicate the start of a local bus cycle (signal –SADS low), i.e., a signal to indicate when a local bus access by a card to card communication bus device may be started. Once this signal is generated data may be transferred to/from the local bus by, for example, a Micro Channel device during the local bus portion of the Micro Channel bus data transfer cycle.

The –MEMCYCLE signal shown in Table 1 indicates that the local cycle is a memory cycle during which actual reads or writes to DRAM can take place (signal –MEMCYCLE low). The –MEMCYCLE signals shown in FIGS. 3–5 are examples of where the on card local bus memory cycle would occur in relation to the –SADS signal.

Finally, as indicated hereinbefore, the CHRDYRTN signal shown in Table 1 indicates (when high) that the current Micro Channel bus cycle can be completed, i.e., that when the data transfer is complete and that the –XCMD signal can be terminated.

Having described each of the signals appearing in FIGS. 3–5 reference should be made to FIG. 3 which depicts a set of control signals generated by a prior art implementation of a method for removing a processor card generated System Hold Acknowledge (SHOLDA) signal after each cycle completed by an Alternate Bus Master. The control signals depicted in FIG. 3 result when the central processing unit (CPU) does not require the local bus between alternate master cycles.

When reviewing FIG. 3 (and FIGS. 4 and 5 as well) it should be recalled that, due to the architecture of the dual bus system, during an Alternate Bus Master granted cycle the processor card is not restricted from conducting local on card cycles both from the CPU cache as well as the processor's on card memory. This capability of allowing multi-device accesses to the resources of the system, as indicated earlier herein, can be used to enrich the processing power of the system.

In the known implementation of the dual bus management techniques, such as those implemented in the IBM System 7586 on the 80386 processor card, the SHOLD/SHOLDA handshaking was conducted before each memory access of SADS. Again, as indicated hereinbefore, this methodology was to insure that the CPU would maintain the right to hold off the oncoming Alternate Master in order to conduct a memory refresh, code fetch, or data access to continue operation. This methodology while proving to be an efficient way to optimize the CPU bus, has the capacity, for the reasons stated hereinbefore, to severely degrade the efficiency of the Micro Channel bus during Alternate Bus Master possession.

The signals depicted in FIG. 3 typify the signal set that results from the prior art dual bus management technique requiring the removal of the SHOLDA signal after each cycle completed by the Alternate Bus Master. The repetitive handshaking sequence (once per cycle) is depicted in FIG. 3 as occurring during handshake intervals 301–304. The actual SHOLD and SHOLDA handshake sequence is shown on lines 305 and 306 of the timing diagram shown in FIG. 3.

In the case of FIG. 3 the CPU is presumed not to be in need of the local bus between Alternate Bus Master cycles, for if the case would have been such that the CPU required the local CPU bus, SHOLDA would remain low and therefore hold off the Alternate Master from the processor card thus yielding the current Micro Channel master owning the bus however not executing any an Micro Channel cycles.

FIG. 4 is a timing diagram illustrating the previously described set of conditions (i.e., where the CPU intervenes to obtain control of the local bus).

In FIG. 4 the first handshake interval, 401, can be seen corresponding to handshake interval 301 of FIG. 3. However, the second "handshake" is not permitted (i.e., SHOLDA is not allowed to go high) during interval 402. The actual handshake sequence under the conditions described with reference to FIG. 4, is shown in lines 403 and 404 of the FIG. 4 timing diagram. The affect of the processor reacquiring the local bus (affect on the other signals and corresponding operations depicted in FIG. 4), may be made by comparing the timing diagrams presented in FIGS. 3 and 4. For example, it can be noted that in FIG. 4 there is no −SADS signal, no −MEMCYCLE signal, etc. while the processor is using the local bus during interval 402.

FIG. 4 also shows the second cycle being resumed and completed during interval 410 when the local bus is reacquired by the Alternate Bus Master.

Those skilled in the art can appreciate the advantage of optimizing the CPU on card access such that the CPU will not be required to wait to fill its instruction prefetch queue from DRAM. The need to service a DRAM refresh request is also an important task that must be handled by the dual bus management techniques contemplated by the invention.

The various problems with the prior art dual bus management techniques, as described in the background section herein, will not be repeated except to say that the dual bus management techniques resulting in signals such as those depicted in FIGS. 3 and 4 can severely degrade system performance during data transfers requiring a plurality of data transfer cycles, principally because of the mandated handshake sequence for each and every cycle.

As indicated hereinabove, the methods and apparatus contemplated by the invention create an optimized balance between local priority and Alternate Bus Master, Micro Channel bus efficiency. The balance is obtained by the use of the aforementioned BSHOG scheduling procedure which allows for multiple Alternate Bus Master accesses to on card memory resources per handshake subject to the following conditions: (a) terminating an on card access by the Alternate Bus Master at the end of a current card to card communications bus (e.g., Micro Channel bus) data transfer cycle if a refresh request is pending; (b) limiting Alternate Bus Master access to on card (processor card) memory to a predetermined number, N, of card to card communications bus memory cycles if the processor (on the processor card) is requesting ownership of its local on card memory bus; and (c) allowing an Alternate Bus Master unlimited access to on card (processor card) memory in situations where the Alternate Bus Master is in possession of the card to card communications bus and the processor requests use of the card to card communications bus.

Allowing for multiple cycles per handshake greatly reduces the overhead required per transfer. A typical master transfer using the data rate management techniques taught herein, as tested with the Portmaster adapter card with N set equal to 4, is approximately 0.74 microseconds/transfer. A typical master transfer without using the invention, also using the Portmaster adapter card, is approximately 1.19 microseconds/transfer. This 450 nanosecond savings is compounded for every additional cycle that is conducted following the first cycle. Because the data rate can be increased for every additional cycle that can be conducted following the initial cycle it was desirable to allow the Alternate Bus Master to continue the bursting of data as long as no internal request for on card devices is received.

First, if indeed a refresh request is received, the BSHOG logic contemplated by the invention should force the removal of SHOLDA. The termination of SHOLDA will halt the activity of the Alternate Bus Master on the local bus and allow for a refresh cycle to take place. An on card refresh cycle will concurrently run while the Alternate Bus Master is still in control of the Micro Channel bus and is awaiting the opportunity to continue the accesses to the CPU on card memory.

Second, suppose a bursting Alternate Bus Master has gained control of the on card bus and is conducting memory cycles when the CPU requires the local memory bus. The calculated time that it takes for the Alternate Bus Master to relinquish the on card bus, followed by the memory cycles and finally the completion of the Alternate Bus Master cycles, is substantial. In fact, the amount of time is so great that setting N equal to 4, as was done when testing the invention as indicated hereinabove (to allow the Alternate Bus Master to complete 4 cycles before yielding the local bus to the CPU), is reasonable in order to enhance the transfer rate per cycle.

It should be noted that if the cycle string is stopped as soon as possible, the time that is used during the first handshake is not distributed across multiple cycles, and therefore will reduce the potential improvements in transfer rate. Allowing the first SHOLD/SHOLDA handshake to be distributed over the aforementioned 4 cycles yields a substantial performance improvement for a bursting Alternate Bus Master without substantially impacting performance of the 80486 microprocessor. Again, as indicated elsewhere herein, N may be variable.

Third, in the case in which the CPU is requesting the Micro Channel bus and the Alternate Bus Master is in control of the local on card bus, the Alternate Bus Master, according to the invention, will be allowed unlimited cycles to complete its necessary transfers before being forced off of the bus. This method will again maximize data rate since the CPU will be put into the HOLD state awaiting Micro Channel bus access via the standard Micro Channel bus arbitration process. Implementation of the data rate management techniques set forth herein will expedite the completion of the Alternate Bus Master cycles and will allow the CPU a more timely access to the Micro Channel bus.

FIG. 5 illustrates the results of BSHOG logic and the increased bus data rate. The single handshake over a 4 cycle period, occurs during interval 501 as shown in FIG. 5. The SHOLD and SHOLDA signals shown at 502 and 503, reflect the single handshake taking place over the 4 cycle interval for the example where N is set equal to 4.

The increased speed of four transfers from 4.74 to 2.86 micro seconds is nearly a 2 fold improvement in data transfer rate. For bursts of length greater than 4 cycles the data rate can actually approach a 2 fold improvement.

The following table (Table 2) summarizes test results reflecting the data rate enhancements obtained by using the Alternate Bus Master bursting data rate management techniques taught herein for a dual bus system including an 80486 processor card and a Micro Channel bus.

TABLE 2

DASD card 32-bit Transfers to from an 80486 Processor Card

WITHOUT utilizing the data rate management techniques taught herein:
4 cycles: 5.01 uS
8 cycles 8.82 uS
Utilizing the Data Rate Management taught herein:

4 cycles: 2.52 uS
8 cycles: 5.82 uS

Portmaster Card Reads from an 80486 Processor Card

WITHOUT utilizing the data rate management techniques taught herein:
4 cycles: 4.74 uS
8 cycles: 9.80 uS
Utilizing the data rate management techniques taught herein:
4 cycles: 2.30 uS
8 cycles: 4.84 uS
4 cycles=start of first cycle to end of fourth cycle.
8 cycles=start of first cycle to end of eighth cycle.

Figure 6:
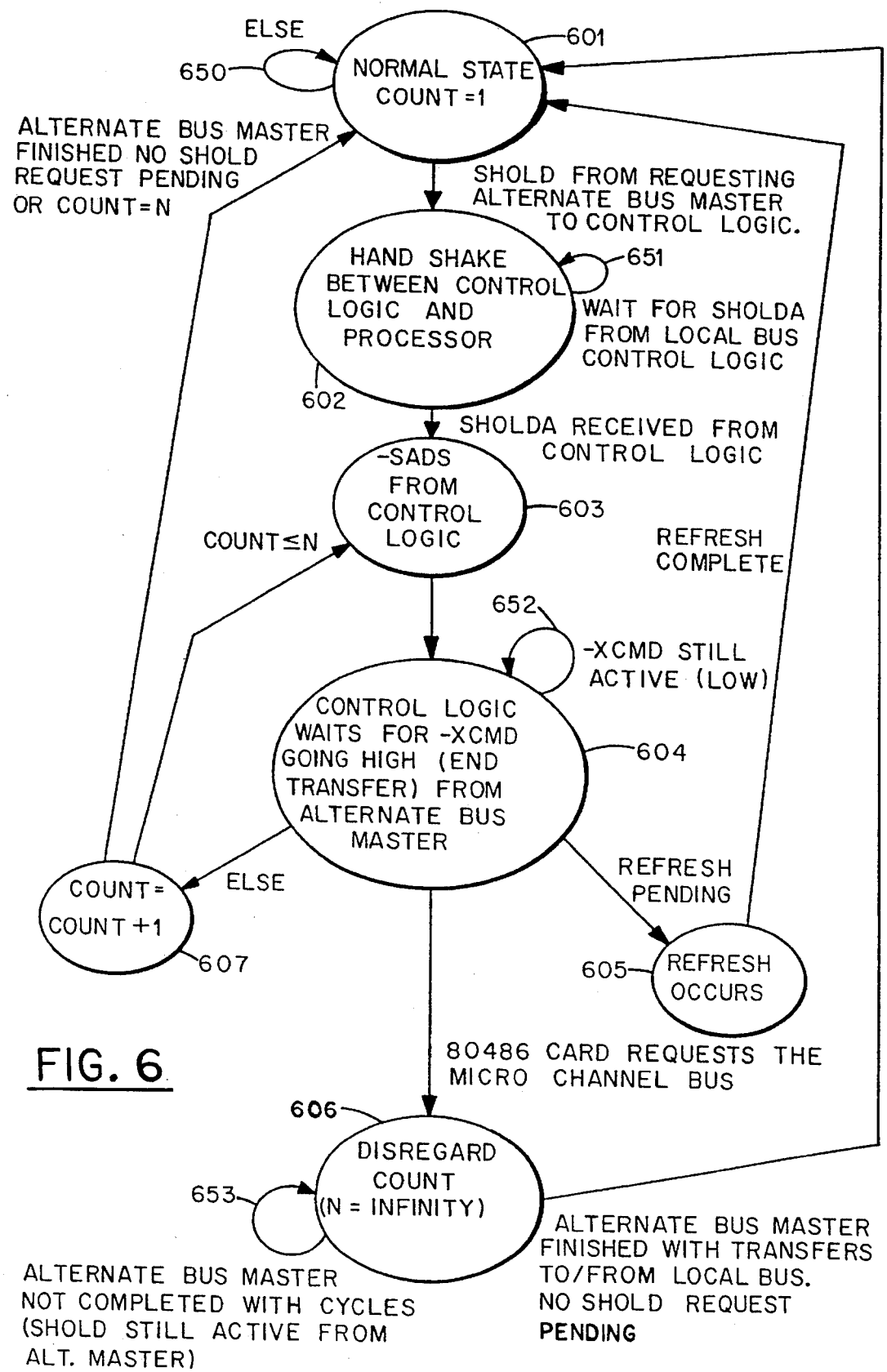
FIG. 6 illustrates the function of logic (and corresponding method steps) which may be utilized to implement a preferred embodiment of the invention, in terms of a state machine/flowchart diagram.

Reference should now be made to FIG. 6 which illustrates the function of BSHOG logic (and corresponding method steps) which may be utilized to implement the preferred embodiment of the invention, in terms of a state machine/flowchart diagram.

Before reviewing the details of the diagram, it should be noted that the logic and method steps functionally described in FIG. 6 could be implemented in hardware, software or some combination of hardware and software. Furthermore, it should be noted that once the 80486 card requests the Micro Channel bus (in the illustrative system set forth with reference to FIGS. 1 and 2), all system activities follow well known rules provided by the Micro Channel arbitration techniques described in the incorporated Micro Channel bus related reference.

Accordingly, the 80486 processor card will be frozen idle in a "wait for Micro Channel bus" state until it is granted ownership of the Micro Channel bus once a request for the bus is made by the processor. Also, it will again be noted that the values allowable for "N", referred to in FIG. 6, may be fixed, programmable or be dynamically changed by the use of various software and/or hardware techniques well within the scope of knowledge of those skilled in the art.

The logic (and corresponding method steps) represented by the state machine depicted in FIG. 6, start with the premise that the local bus is owned by the processor card or complex when in the "normal" state, shown at block 601. In the normal state, a counter is set equal to one. This counter may ultimately be used, as will be explained hereinafter, to count up to a predetermined (and potentially programmable) value of N, where N is intended to be a maximum number of card to card communications bus cycles that an Alternate Bus Master can hold onto ownership of the local bus (from the time it was granted the local bus) if the processor (on the processor card) is requesting ownership of the local bus.

N is also presumed to be greater or equal to 2 to effectively distribute the handshake interval referred to hereinbefore across two or more data transfer cycles. This distribution of the handshake overhead results in the substantial system performance improvements that can be achieved when utilizing the invention, particularly when burst mode data transfer operations are in process.

The BSHOG logic, according to a preferred embodiment of the invention, has N set equal to 4 to achieve the performance improvement results described hereinbefore with reference to Table 2.

The BSHOG logic, according to a preferred embodiment of the invention, after being initially being set to the normal state, remains in the normal state (as indicated by loop 650), until an SHOLD signal, generated on the processor card as a result of an Alternate Bus Master request to gain control of the local bus (as explained hereinbefore), is detected. The BSHOG logic then enters a new state, shown at 602 in FIG. 6 where it waits to detect completion of the handshake between the control logic and the processor. Loop 651 indicates the wait for the SHOLDA signal from the local bus control logic.

The next state, shown at 603 in FIG. 6, is entered into when the Alternate Bus Master has taken control of the local bus (i.e., upon detecting SHOLD active) and the −SADS signal, described hereinbefore to indicate the start of the local bus cycle, is then generated by the BSHOG logic.

Upon generation of the −SADS signal the BSHOG logic enters its next state, shown at block 604 of FIG. 6, where it waits for the −XCMD signal to go high signalling the end of data transfer condition. Loop 652 indicates that −XCMD is still active (low) and that the BSHOG logic is waiting for the data transfer to be completed.

Upon determining −XCMD going high, the BSHOG logic takes one of three paths.

First, if a refresh request is pending, the refresh request occurs with the processor taking control of the local bus. After completion of the refresh request operation, the normal state is re-entered with the count set equal to 1. This first path is illustrated by exiting block 604 and returning to block 601 via block 605.

The second possible path (where no refresh request is pending) is the one taken where the processor card requests the card to card communications bus (e.g., the 80486 card requesting the Micro Channel bus).

In this situation, the count N is disregarded (or can be thought of as being set equal to infinity as shown at block 606 in FIG. 6). In this state multiple data transfer cycles can occur (for example, local bus via the Micro Channel bus) without interruption (as shown by loop 653) until the Alternate Bus Master is finished with transfers to/from the local bus and no further SHOLD request is pending.

When the Alternate Bus Master is finished using the local bus, the BSHOG logic operating in this second path returns to the normal state, block 601.

The third and final possible path upon leaving the waiting for −XCMD to go high state, is taken in situations where neither a refresh request is pending nor a processor card request for the card to card communications bus (e.g., Micro Channel bus) is outstanding (i.e., neither path 1 or 2, previously described herein, have been taken).

In this situation, count is incremented as shown in block 607 of FIG. 6 (although alternatively this step can be skipped where the Alternate Bus Master is finished with the local bus or no SHOLD request is pending).

If the count is less than or equal to N, the BSHOG logic returns to the state indicated at block 603 of FIG. 6, where another Alternate Bus Master to local bus data transfer cycle begins. If the Alternate Bus Master is finished with the local bus, if no SHOLD request is pending or if the count is greater than N, the BSHOG logic returns to the normal state, shown at block 601 of FIG. 6.

The state machine depicted in FIG. 6 fully illustrates the principles of the invention in functional terms. Those skilled in the art having the benefit of the state machine/flowchart depicted in FIG. 6 can easily implement the BSHOG logic and corresponding method steps using a variety of well know, commercially available, logic devices.

The circuit used to implement the BSHOG function can be easily contained in two Programmable Logic Devices (PLDs). The simplicity of this design makes it a cost effective performance increase for a dual bus 80486 microprocessor system.

Furthermore, although described in FIG. 6 with reference to a processor card System Bus Master and separate Alternate Bus Master card, those skilled in the art, as indicated elsewhere herein, will readily appreciate that the teachings of the invention set forth with reference to FIG. 6, may be readily adapted for use in processor complex oriented systems, systems having an Alternate Bus Master and System Bus Master on the same card, systems combining the aforementioned architectures, etc.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

For example, the use of the term "processor card" as used herein is not meant to be an invention limiting factor since the invention will be appreciated by those skilled in the art as being useful where processor complexes are employed in a dual bus system. Similarly, those skilled in the art will also appreciate that the Alternate Bus Master and System Bus Master may physically be located on the same card, that the term card to card communications bus could be effectively replaced with references to a complex to complex communication bus in complex oriented systems, etc., as indicated herein before.

In addition, while refresh requests were used to illustrate the features and advantages of the invention, those skilled in the art will recognize that the invention can be applied to other high priority tasks. For example, catastrophic error conditions, high priority interrupt handling, etc., can be efficiently processed using the techniques taught by this invention.

The embodiments and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. A method for efficiently managing data transfers in a computer system containing processor and memory subsystems, peripheral devices, and a dual bus structure; said dual bus structure including a local bus interconnecting said processor and memory subsystems, and a communications bus interconnecting said local bus and said peripheral devices; said processor subsystem exerting bus master control over said dual bus structure; access to said communications bus entailing a potentially time-consuming arbitration procedure; said peripheral devices including at least one Alternate Bus Master bursting (ABMB) device adapted for operating as a bus master relative to said communications bus for conducting multiple cycles of burst data transfer activity over said buses during a single interval in which the respective ABMB device controls access to said communications bus; said method comprising:

while said ABMB device is in control of said communications bus, after having prevailed in said arbitration procedure, and while said ABMB device is conducting multiple cycles of burst data transfer activity over both said communications bus and said local bus;

(a) monitoring said system for occurrence of a predetermined condition; and, upon detection of said condition, (b) suspending said ABMB device's access to said local bus, to allow for said processor subsystem to perform a task relative to said memory subsystem, while permitting said ABMB device to retain control of said communications bus without repetition of said arbitration procedure; and, upon completion of said task, (c) permitting said ABMB device, without repetition of said arbitration procedure relative to said communications bus, to require access to said local bus and continue with other said cycles of data transfer activity over both said buses;

wherein a said monitoring step comprises monitoring said system for occurrences of first and second priority conditions; said first condition being associated with a requirement for said processor subsystem to perform a time-critical task relative to said memory subsystem, and said second condition being associated with a requirement for said processor subsystem to perform a non-time-critical task relative to said memory subsystem; and said suspending step is applied at the end of a given cycle of data transfer activity by said ABMB device when a said first priority condition is first detected during said given cycle, and said suspending step is applied after a predetermined number of n cycles (n<1) of said data transfer activity following said given cycle when a said second priority condition is first detected during said given cycle and no first priority condition is detected in said given cycle.

2. The method according to claim 1 wherein said time-critical task is a memory refresh operation.

3. The method according to claim 1 wherein n is a fixed number.

4. The method according to claim 1 wherein n is a number which can be varied programmably during operation of said system.

5. A method for efficiently managing data transfers in a computer system containing processor and memory subsystems, peripheral devices, and a dual bus structure; said dual bus structure including a local bus interconnecting said processor and memory subsystems, and a communications bus interconnecting said local bus and said peripheral devices; said processor subsystem exerting bus master control over said dual bus structure; said peripheral devices including at least one Alternate Bus Master bursting (ABMB) device adapted for operating as a bus master relative to said communications bus for conducting multiple cycles of burst data transfer activity over said buses during a single interval in which the respective ABMB device controls access to said communications bus; said method comprising:

while said ABMB device is in control of said communications bus, and conducting multiple cycles of burst data transfer activity over both said communications bus and said local bus:

(a) monitoring said system for occurrence of a predetermined condition; and, upon detection of said condition, (b) suspending said ABMB device's access to said local bus to allow for said processor subsystem to perform a task relative to said memory subsystem, while permitting said ABMB device to retain control of said communications bus; and, upon completion of said task, (c) permitting said ABMB device to reacquire access to said local bus and continue with other said cycles of data transfer activity over both said buses;

wherein said monitoring step comprises monitoring said system for occurrences of first and second priority conditions; said first condition being associated with a requirement for said processor subsystem to perform a time-critical task relative to said memory subsystem, and said second condition being associated with a requirement for said processor subsystem to perform a non-time-critical task relative to said memory subsystem;

wherein said suspending step is applied at the end of a given cycle of data transfer activity by said ABMB device when a said first priority condition is first detected during said given cycle, and said suspending step is applied after a predetermined number of n cycles (n>1) of said data transfer activity following said given cycle when a said second priority condition is first detected during said given cycle and no first priority condition is detected in said given cycle;

wherein access of said ABMB device to said local bus requires performance of a predetermined handshake procedure between parts of said processor subsystem controlling access to said dual bus structure, each performance of said handshaking procedure imposing a predetermined minimal delay on the respective access of said ABMB device to said local bus; and wherein:

when said cycles of data transfer activity by said ABMB device are suspended due to detection of a said first priority condition during a said given cycle, performance of a single instance of said handshaking procedure is distributed over all cycles of data transfer activity prior to the suspension, including said given cycle, and performance of said handshaking procedure is repeated and distributed over cycles of data transfer activity which resume after the suspension ends; and when said cycles of data transfer activity are suspended due to detection of a said second priority condition in said given cycle, performance of a single instance of said handshake procedure is distributed over all cycles of data transfer activity preceding the suspension, including said given cycle and said n cycles following said given cycle, and performance of said handshake procedure is repeated and distributed over any cycles of data transfer activity which resume after the suspension ends.

6. Apparatus for efficiently managing data transfers in a computer system having a dual bus; said dual bus comprising a local bus and a communications bus isolated from said local bus; access to said communications bus entailing execution of a potentially time-consuming arbitration procedure; said computer system containing processor and memory subsystems interconnected by said local bus; said processor subsystem acting as a bus master relative to said dual bus; said communications bus serving to connect peripheral devices to both said subsystems via said local bus; said peripheral devices including at least one Alternate Bus Master bursting (ABMB) acting as an alternate bus master relative to said communications bus with capability for conducting plural cycles of data transfer activity over said dual bus without relinquishing control of said communications bus; said computer system comprising:

mean s effective while said ABMB device is in control of said communications bus, and while said device is conducting plural cycles of data transfer activity over said dual bus, for monitoring said computer system for a predetermined condition; and means responsive to detection of said predetermined condition by said monitoring means for:
(a) temporarily suspending said cycles of data transfer activity by said ABMB device, while permitting said device to retain control of said communications bus without requiring re-execution of said arbitration procedure in respect to said device's control of said communications bus;
(b) allowing said local bus to be used by said processor subsystem until said predetermined condition is cleared; and
(c) allowing said ABMB device, without re-execution of said arbitration procedure relative to said communications bus, to regain use of said local bus and continue said cycles of data transfer activity after said condition is cleared:

wherein said monitoring means is adapted to detect first and second predetermined conditions requiring said processor subsystem to use said local bus but not said communications bus; said first condition representing pendency of a time-critical task needed to be performed by said processor subsystem via only said local bus, and said second condition representing performance of non-time-critical task needed to be performed by said processor subsystem via only said local bus; and said means responsive to detection of said condition to suspend said data transfer activity by said ABMB device operates;
(a) to effect said suspension at the end of a given cycle of said data transfer activity when said first condition is first detected during said given cycle; and,
(b) to effect said suspension after a predetermined number n of additional cycles of data transfer activity subsequent to said given cycle (n<1) when said second condition is first detected during said given cycle.

7. Apparatus according to claim 6 wherein n is a fixed number.

8. Apparatus according to claim 6 wherein n is a number which can be varied programmably during operations of said system.

9. Apparatus according to claim 6 wherein said first priority condition is a requirement for performance of a memory refresh operation relative to said memory subsystem.

10. Apparatus for efficiently managing data transfers in a computer system having a dual bus; said dual bus comprising a local bus and a communications bus isolated from said local bus; said computer system containing processor and memory subsystems interconnected by said local bus; said processor subsystem acting as a bus master relative to said dual bus; said communications bus serving to connect peripheral devices to both said subsystems via said local bus; said peripheral devices including at least one Alternate Bus Master bursting (ABMB) acting as an alternate bus master relative to said communications bus with capability for conducting plural cycles of data transfer activity over said dual bus without relinquishing control of said communications bus; said computer system comprising:

means effective while said ABMB device is in control of said communications bus, and while said device is conducting plural cycles of data transfer activity over said dual bus, for monitoring said computer System for a predetermined condition; and means responsive to detection of said predetermined condition by said monitoring means for:
(a) temporarily suspending said cycles of data transfer activity by said ABMB device, without affecting said device's control of said communications bug;
(b) allowing said local bus to be used by said processor subsystem until said predetermined condition is cleared; and
(c) allowing said ABMB device to regain use of said local bus and continue said cycles of data transfer activity after said condition is cleared:

wherein:

said monitoring means is adapted to detect first and second predetermined conditions requiring said processor subsystem to use said local bus but not said communications bus; said first condition representing pendency of a time-critical task needed to be performed by said processor subsystem via only said local bus, and said second condition representing performance of non-time-critical task needed to be performed by said processor subsystem via only said local bus; and said means responsive to detection of said condition to suspend said data transfer activity by said ABMB device operates:
(a) to effect said suspension at the end of a given cycle of said data transfer activity when said first condition is first detected during said given cycle; and
(b) to effect said suspension after a predetermined number n of additional cycles of data transfer activity subsequent to said given cycle (n>1) when said second condition is first detected during said given cycle; and wherein:

access of said ABMB device to said local bus requires performance of a predetermined handshake procedure between parts of said processor subsystem controlling access to said dual bus structure, each performance of said handshaking procedure imposing a predetermined minimal delay on the respective access of said ABMB device to said local bus; and said apparatus includes:

means controlling performance of said handshaking procedure to:
(a) cause said handshaking procedure to be distributed over all cycles of data transfer activity by said ABMB device up to and including said given cycle, when a said first priority condition is first detected during a said given cycle resulting in a said suspension of said data transfer activity;
(b) cause said handshaking procedure to be distributed over all cycles of data transfer activity up to and including said given cycle and said n cycles following said given cycle, when said second priority condition is first detected in said given cycle resulting in said suspension of said activity after said n following cycles; and
(c) cause said handshaking procedure to be repeated and distributed over any cycles of data transfer activity by said ABMB device which resume after said suspension ends.

* * * * *